United States Patent [19]

Graupmann

[11] 3,927,775
[45] Dec. 23, 1975

[54] RAMP FOR TRANSPORTING WHEEL MOUNTED MACHINERY

[75] Inventor: Lloyd Earl Graupmann, Plato, Minn.

[73] Assignee: Chromalloy American Corporation, Lester Prairie, Minn.

[22] Filed: Oct. 29, 1974

[21] Appl. No.: 518,464

[52] U.S. Cl. .................. 214/85; 14/71 H; 214/334; 296/1 A
[51] Int. Cl.² .......................................... B65G 67/02
[58] Field of Search .......... 214/85, 85.1, 86 A, 334; 296/1 A; 14/71 R, 71 H, 72 R, 72 W

[56] References Cited
UNITED STATES PATENTS

| | | | |
|---|---|---|---|
| 3,224,611 | 12/1965 | Smuck | 214/334 |
| 3,603,467 | 9/1971 | Siler | 214/334 |
| 3,834,565 | 9/1974 | Goodman et al. | 214/85 |

*Primary Examiner*—Albert J. Makay
*Attorney, Agent, or Firm*—Dorsey, Marquart, Windhorst, West & Halladay

[57] ABSTRACT

A main ramp member, having a first end and a top surface, is provided with two base members telescopingly mounted for transverse movement at either side thereof and means for mounting the first end to a trailer for rotation of the main ramp member between a loading position and a transporting position. Each of two receiving ramp members has a first end pivotally mounted proximate to the first end of the main ramp member to a corresponding base member below the plane of the top surface thereof. When the main ramp member is in its loading position, each receiving ramp member is elevated above the base member by a foot member which contacts the ground. When the main ramp member is in its transporting position, each base member supports the receiving ramp member mounted thereto below the plane of the top surface of the main ramp member. Bars are provided which cooperate with the receiving ramp members to form two wheel receptacles in which the rear wheels of wheel mounted machinery are disposed and thereby restrained against rotation when the main ramp member is in its transporting position.

14 Claims, 5 Drawing Figures

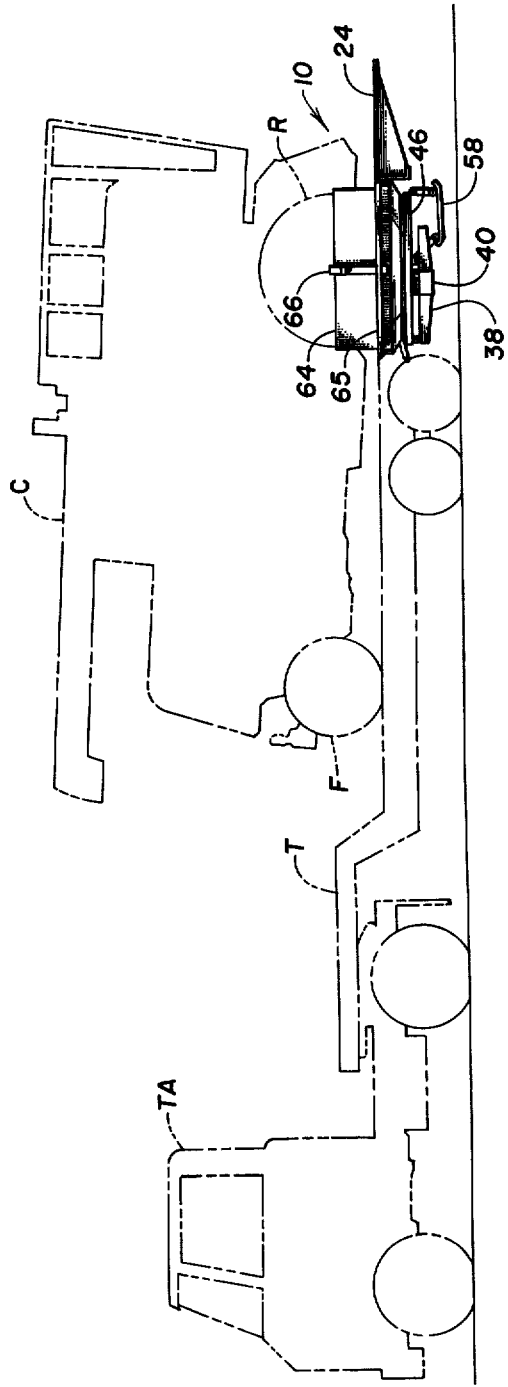
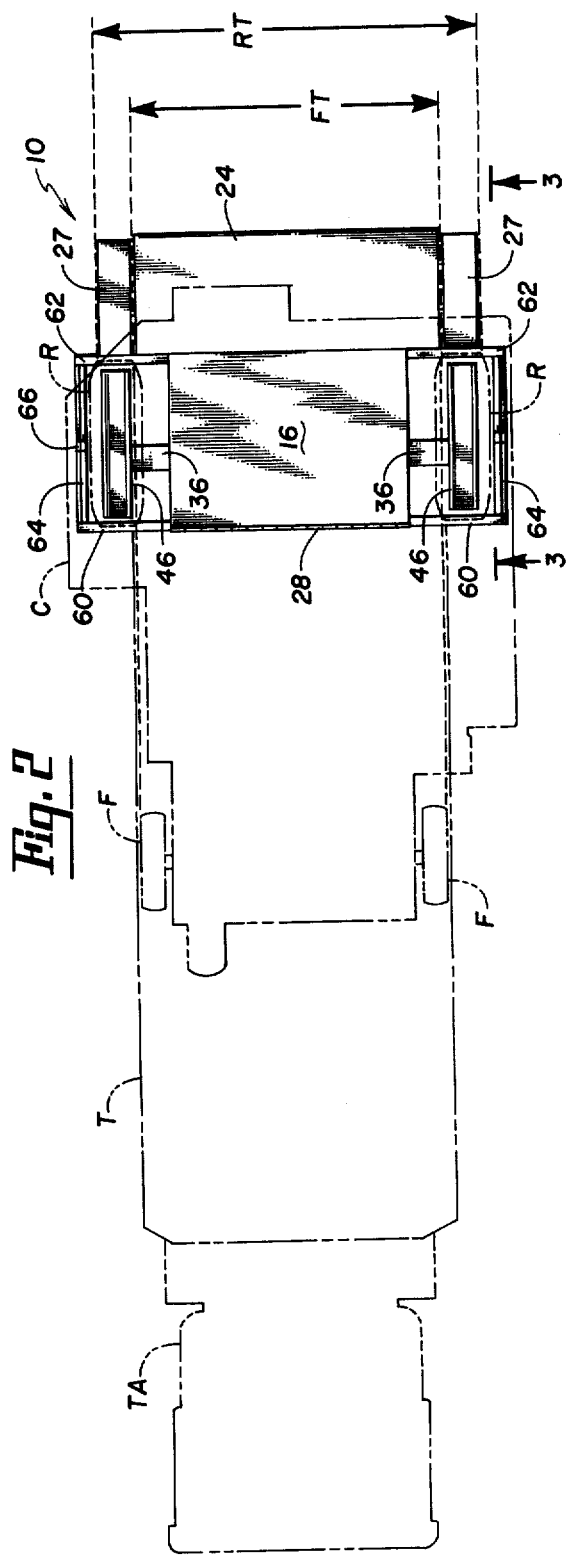

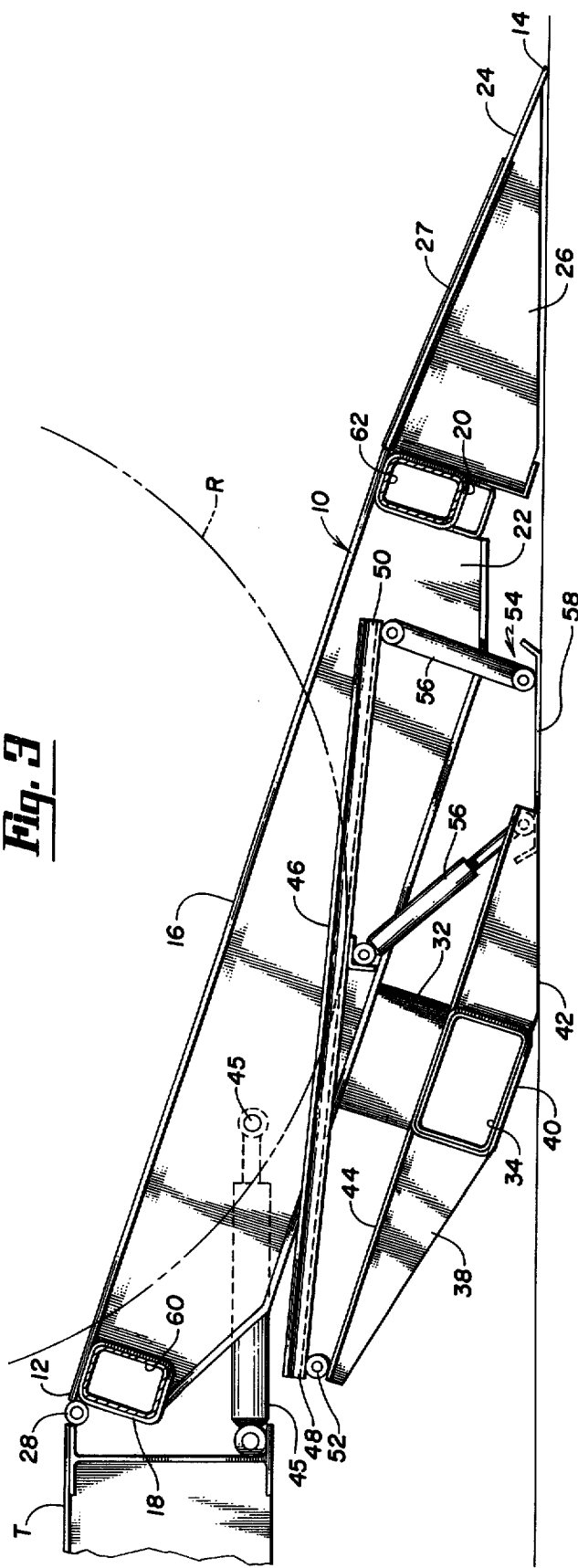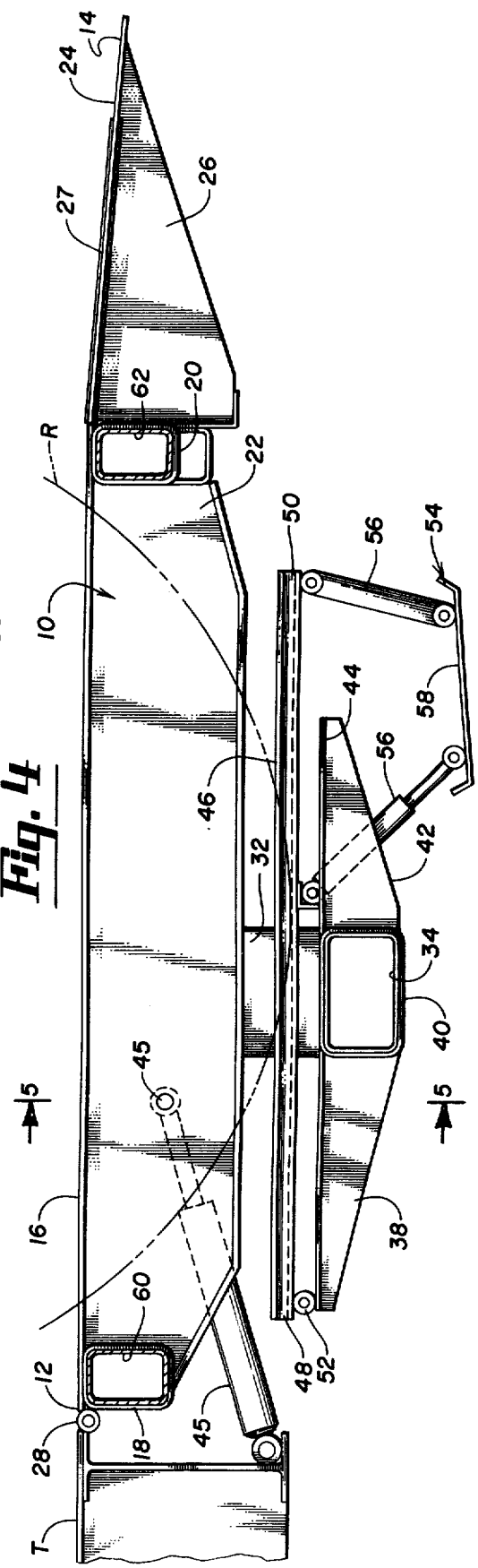

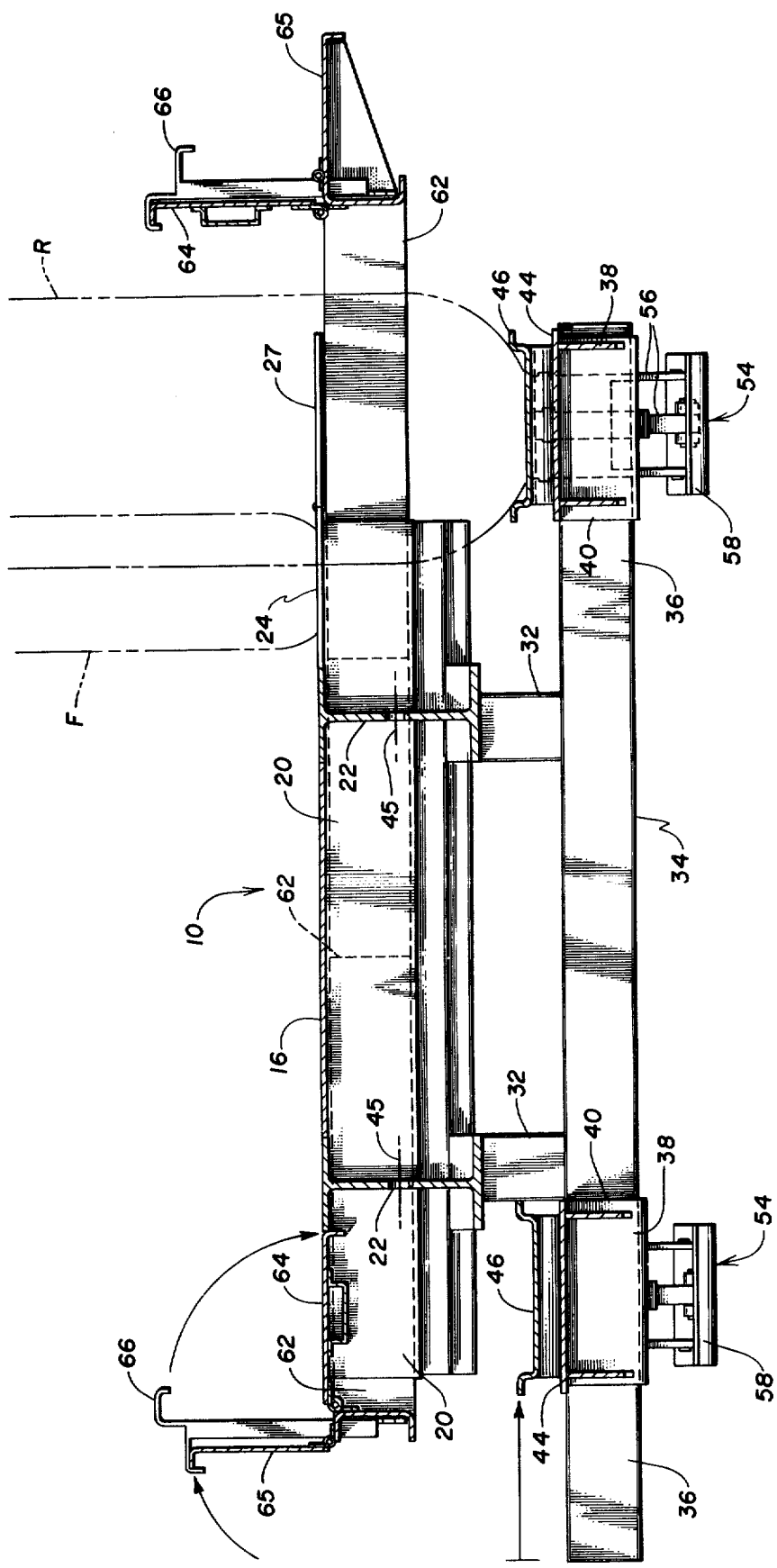

RAMP FOR TRANSPORTING WHEEL MOUNTED MACHINERY

BACKGROUND OF THE INVENTION

1. Field of the Invention

This invention relates to a ramp and, more particularly, to a ramp for use with a trailer for transporting wheel mounted machinery.

2. Description of the Prior Art

Wheel mounted machinery often must be transported over public highways for use as a particular location. Many types of such machinery are too large and move too slowly to be transported safely under their own power and therefore must be loaded onto a trailer which is accordingly towed by a conventional tractor. An example of one kind of machine which particularly presents this problem is an agricultural grain combine which must be transported from its point of manufacture to its point of use or between remotely located points of use.

Trailers used to transport such machinery generally have a trailer bed which is close to the ground and a ramp which is provided at one end of the trailer. The ramp is mounted to pivot downwardly into a loading position so that the machinery can be rolled onto the trailer bed and to pivot upwardly into a transporting position in which the ramp clears the ground. The machinery is then secured in position on the trailer bed and is ready for transportation.

One approach to securing the machinery in position on such trailers is to provide wheel wells or receptacles in the ramp into each of which a rear wheel of the machinery is guided while the ramp is down. When the ramp is pivoted upwardly into its transporting position, the wheel rests in the wheel well and is thereby prevented from rotation, thus securing the machinery against rolling so that it may be transported safely. In prior art ramps, such wheel wells have been formed by recessing a portion of the ramp, and, in order to provide the stability required during loading of very heavy machinery, this recessed portion has been made so that it rests on the ground when the ramp is in its loading position.

However, serious serioius problem is created by making the recessed portion so that it rests on the ground when the ramp is in its loading position. The wheel wells formed thereby are often too deep to permit loading of machinery having a low ground clearance since, as the rear wheels are guided into the wheel wells, the bottom of the machinery will scrape the trailer bed, or, in more severe cases, prohibit loading altogether. Although this problem can be solved by designing the recessed portion so that its top surface is far enough from the ground to prevent this problem, the wheel wells will be shallower in such a design. With shallower wheel wells, the possibility that the wheels will roll out of them as the machinery is being transported is increased.

The applicant's invention solves this problem by providing a ramp suitable for use in loading wheel mounted machinery having extremely low ground clearance onto a trailer while providing a wheel receptacle having sufficient depth to secure the machinery during transportation.

SUMMARY OF THE INVENTION

It is an object of the present invention to provide a ramp for use with a trailer for loading and transporting wheel mounted machinery.

In accordance with the present invention, a main ramp member is provided which includes a load bearing means and means for mounting a first end of the main ramp member to a trailer for rotation of the main ramp member between a loading position and a transporting position. A receiving ramp means is provided for receiving thereon a wheel of the machinery, which receiving ramp means has a first end which is pivotally mounted to the main ramp member proximate to its first end and below the plane of the top surface thereof. The receiving ramp means includes a foot member for contacting the ground when the main ramp member is in its loading position to support the receiving ramp means. The receiving ramp means is supported by the load bearing means below the plane of the surface of the main ramp member when the main ramp member is in its transporting position. A restraining means cooperates with the receiving ramp means to form a wheel receptacle in which a wheel of the machinery is supported and restrained against rotation when the main ramp member is in its transporting position.

BRIEF DESCRIPTION OF THE DRAWINGS

The present invention may be better understood by reference to the specification when taken in conjunction with the accompanying drawings, in which like numerals refer to like features throughout, wherein:

FIG. 1 is a side view of the ramp of the present invention in its transporting position mounted to a trailer and having a wheel mounted machinery thereon in position for transportation.

FIG. 2 is a top view of the ramp of the present invention in its loading position mounted to a trailer and having wheel mounted machinery in position for movement of the ramp to its transporting position.

FIG. 3 is a sectional view taken along line 3—3 of FIG. 2.

FIG. 4 is a sectional view taken at the same location as line 3—3 of FIG. 2 and showing the ramp of the present invention in its transporting position.

FIG. 5 is a sectional view taken along line 5—5 of FIG. 4.

DETAILED DESCRIPTION OF THE INVENTION

Referring now to FIGS. 1 and 2, the ramp of the present invention is shown mounted to a trailer T which is connected in a conventional manner to a tractor TA for towing trailer T. Wheel mounted machinery, represented here as an agricultural grain combine C, is in position on trailer T and the ramp of the present invention for towing. Combine C has front wheels F, having tracking width FT, and rear wheels R, having tracking width RT.

Referring further to FIGS. 3 through 5, the ramp of the present invention comprises a main ramp member 10 having a first end 12, a second end 14, and a top surface 16. Top surface 16 is formed by plates which are suitably secured, as by welding, to a front square channel beam 18, a rear square channel beam 20, and longitudinal supports 22 welded therebetween, to form a unitary structure. Beams 18, 20 extend transversely of main ramp member 10 as best seen in FIG. 5. Portion 24 of main ramp member 10 extends beyond rear beam 20 and is welded to web members 26 which are in turn welded to rear beam 20 so that web members 26 provide support for portion 24. Folding members 27 are pivotally mounted to each side of portion 24 (see FIGS. 2 and 5). Main ramp member 10 includes means 28 for mounting first end 12 to trailer T for rotation of main ramp member 10 between its loading position (FIGS. 2 and 3) and its transporting position. (FIGS. 1, 4 and 5). Means 28 may take any form but is most conveniently a hinge plate which extends the width of main ramp member 10 for engagement with a cooperating hinge plate mounted to trailer T.

Main ramp member 10 also includes downwardly depending struts 32 which support a square channel 34 having outwardly extending cantilevered portions 36. Each of two base members 38 includes a square channel 40 which fits in telescoping relationship over a corresponding cantilevered portion 36 of square channel 34 so that base members 38 are movable a limited distance in a transverse direction. Suitable means (not shown) may be provided for securing base members 38 to cantilevered portions 36 at a plurality of transverse locations, or base members 38 may be loosely mounted on cantilevered portions 36. Each base member 38 has a base portion 42 which contacts the ground when main ramp member 10 is in its loading position (see FIG. 3) in order to provide support intermediate of front beam 18 and rear beam 20. Load bearing means is formed by top surfaces 44 of base members 38. Power means, such as hydraulic actuators 45, provide the necessary power for rotation of main ramp member 10 between its loading and transporting position.

A receiving ramp means is provided which comprises two receiving ramp members 46, each having a first end 48 and a second end 50. A hinge 52 pivotally mounts first end 48 of each receiving ramp member 46 to a corresponding base member 38 proximate to a first end 12 of main ramp member 10 and below the plane of top surface 16 thereof. A foot member 54 is provided for each receiving ramp member 46 which foot members 54 contact the ground to support each receiving ramp member 46 when main ramp member 10 is in its loading position (see FIG. 3). Each foot member 54 includes downwardly depending links 56 and a skid 58 for contacting the ground. Links 56 are mounted to the corresponding skid 58 and receiving ramp member 48.

A pair of front bars 60 are telescopingly mounted within opposite ends of front square channel beam 18 and a pair of rear bars 62 are telescopingly mounted within opposite ends of rear square channel beam 20 and suitable means (not shown) are provided for securing bars 60, 62 in any of a plurality of positions. Panels 64 (see FIG. 5) are pivotally mounted between each front bar 60 and rear bar 62 for rotation between a lowered position (shown at the left of FIG. 5) and raised position (shown at the right of FIG. 5). Auxiliary panels 65 are also pivotally mounted between each front bar 60 and rear bar 62 for rotation between a raised position (shown at the left of FIG. 5) and a lowered position (shown at the right of FIG. 5). Trees 66 are slidably mounted to the ends of bars 60 and 62 to hold panels 64 or auxiliary panels 64 or panels 65, in their raised position. To lower panels 64 or auxiliary panels 65, trees 66 are raised a limited distance to free the panel which is to be lowered, and then replaced to hold the panel which is to be maintained in its raised position. If both panels 64 and auxiliary panels 65 are to be lowered, trees 66 can be removed completely merely by sliding them vertically. Suitable means (not shown) can be used to secure trees 66 in position to insure that they will not come free during transportation.

In operation, when main ramp member 10 is in its loading position (see FIG. 3) second end 14 of main ramp member 10 contacts the ground and foot members 54 support receiving ramp members 46. Panels 64 are moved to their lowered position and bars 60 and 62 are moved inwardly so that panels 64 occupy a first position wherein they form a portion of top surface 16 of main ramp member 10 (see left-hand portion of FIG. 5). A wheel mounted machine, such as combine C having front wheels F with a tracking width FT (see FIG. 1), is either winched or driven under its own power partially up main ramp member 10 onto the trailer T until front wheels F are on the bed of trailer T. Panels 64 are then moved to their raised position and bars 60 and 62 are moved outwardly, wherein panels 64 occupy a second position and expose receiving ramp member 46 (see right-hand portion of FIG. 5). Folding members 27 are rotated outwardly (see FIG. 2 and right-hand portion of FIG. 5) and the machine is further driven or winched onto trailer T until rear wheel R are received onto receiving ramp members 46. It is apparent that means for securing base members 38 to cantilevered portions 36 of square channel 34 are not necessary since the weight of the machinery, when in place, will hold base members 38 in their position.

Hydraulic actuators 45 then pivot main ramp members 10 into its transporting position, and load bearing surfaces 44 of base members 38 contact corresponding receiving ramp members 46 to support receiving ramp members 46 below top surface 16 of main ramp member 10 (see FIG. 4). When main ramp member 10 is in its transporting position, front bars 60 and rear bars 62 comprise restraining means by virtue of the fact that front channel 18 and rear channel 20 are disposed proximate to first end 48 and second end 50, respectively, of receiving ramp members 46. The restraining means cooperate with receiving ramp members 46 to form wheel receptacles for restraining rear wheels R against rotation when the machinery is transported (see FIG. 1).

It will be apparent from this description that if machinery in which the tracking width of the front wheels is narrower than the portion of the top surface of main ramp member 10 between the wheel receptacles, then panels 64 may occupy their second position during the entire loading operation, thus further simplifying the operation of the ramp of the present invention. As is also apparent, the ramp of the present invention may be used with machinery having rear wheels with a tracking width different from the tracking width RT of combine C by moving base members 38 transversely on cantilevered portion 36 of square channel 34 to accommodate this difference in tracking width.

Additional features of the ramp of the present invention are the ability to use the ramp in a conventional manner, that is, without a wheel receptacle, and its capability of such use with trailers of various widths. Panel 64 is pivoted downwardly and bars 60, 62 are telescoped inwardly and secured so that panel 64 occupies its first position. Folding member 27 can then be rotated inwardly so that it lays on top of portion 24 of main ramp member 10, or remain rotated outwardly if a trailer which is wider than trailer T is being used (see FIG. 1). In the latter case, auxiliary panels 65 are lowered and tree 66 is removed, thus forming an uninterrupted surface for loading items onto the trailer bed. Base members 58 may either be removed by sliding them off the ends of the square channel 34 or stowed in the position shown in the left-hand portion of FIG. 5.

Although a receiving ramp means has been disclosed herein as comprising two receiving ramp members disposed at either side of a main ramp member, pivotally mounted to and supported by two corresponding base members, it will be readily recognized by those skilled in the art that the ramp of the present invention may also be used to secure against movement during transportation machinery having any number of wheels. When such is the case, the receiving ramp means may comprise as many receiving ramp members as there are wheels to be secured and they may be disposed at any convenient location relative to the main ramp member, even in the center thereof, without departing from the spirit of the invention. Those skilled in the art will also recognize that base members 38 need not take the form shown herein; the spirit of the invention only requires that the receiving ramp means be pivotally mounted and supported below the top surface of the main ramp member when the main ramp member is in its transporting position. Further, bars 60, 62 may be replaced with other suitable restraining means without departing from the spirit of the invention.

The present invention thus discloses a ramp in which wheel mounted machinery may be easily loaded and secured against movement during transportation. The ramp of the present invention enables machinery having a low ground clearance to be loaded by providing a wheel receptacle having a reduced depth when the ramp is in its loading position but which has sufficient depth to insure that the wheel received therein will not roll when the ramp is in its transporting position.

Although one specific embodiment of the present invention has been shown, those skilled in the art will perceive further modifications other than those specifically pointed out above which can be made without departing from the spirit of the invention, and it is intended by the appended claims to cover all such modifications as fall within the true spirit and scope of the invention.

What is claimed as new and desired to be secured by Letters Patent of the United States is:

1. A ramp for use with a trailer of the type used to transport wheel mounted machinery, the ramp comprising:
    a main ramp member having a first end and a top surface and including load bearing means and means for mounting said first end to the trailer for rotation of said main ramp member between a loading position and a transporting position;
    receiving ramp means for receiving thereon a wheel of the machinery to be transported, said receiving ramp means having a first end pivotally mounted to said main ramp member below the plane of said top surface and proximate to said first end of said main ramp member and a foot member for contacting the ground to support said receiving ramp means when said main ramp member is in said loading position, wherein said receiving ramp means is supported below the plane of said top surface by said load bearing means when said main ramp member is in said transporting position; and
    restraining means cooperating with said receiving ramp means to form a wheel receptacle for restraining the wheel received thereon against rotation when said main ramp member is in said transporting position.

2. The ramp recited in claim 1 wherein said main ramp member further includes a base member having a top surface comprising said load bearing means, wherein said first end of said receiving ramp means is pivotally mounted to said base member.

3. The ramp recited in claim 2 wherein said base member includes a base portion for contacting the ground to support said main ramp member when in said loading position.

4. The ramp recited in claim 1 wherein said foot member includes a plurality of downwardly depending links mounted to said receiving ramp means and a skid mounted to said links.

5. The ramp recited in claim 1 wherein:
    said load bearing means comprises two load bearing surfaces disposed at opposite sides of said main ramp member;
    said receiving ramp means comprises two receiving ramp members each for receiving thereon one wheel of the machinery to be transported, each said receiving ramp member having a first end pivotally mounted at opposite sides of said main ramp member below the plane of the top surface and proximate to said first end of said main ramp member and a foot member for contacting the ground to support said receiving ramp member when said main ramp member is in said loading position, wherein each said receiving ramp member is supported below the plane of said top surface by a corresponding load bearing surface when said main ramp member is in said transporting position; and
    said restraining means cooperate with each said receiving ramp member to form two wheels receptacles for restraining the wheels received thereon against rotation when said main ramp member is in said transporting position.

6. The ramp recited in claim 5 further including two folding members pivotally each mounted to opposite sides of said main ramp members proximate said second end thereof.

7. The ramp recited in claim 5 wherein said main ramp member further includes two base members each having a top surface comprising a corresponding load bearing surface, wherein said base members are mounted for transverse movement relative to said main ramp member and said first end of each said receiving ramp member is pivotally mounted to a corresponding base member.

8. The ramp recited in claim 5 wherein:
    said main ramp member further includes front and rear square channel beams extending transversely thereof, wherein said front square channel beam has two front bars telescopingly mounted to opposite ends thereof and said rear square channel beam has two rear bars telescopingly mounted in opposite ends thereof, and two panels each pivotally mounted between corresponding pairs of said front and rear bars, wherein said panels are movable between a first position in which said panels form a portion of said top surface and a second position in which said bars are telescoped outwardly and said panels are pivoted upwardly and outwardly; and said pairs of front and rear bars comprise said restraining means.

9. The ramp recited in claim 8 wherein said main ramp member further includes two base members each having a top surface comprising a corresponding load bearing surface, wherein said base members are removably mounted to said main ramp member and said first end of each of said receiving ramp member is pivotally mounted to a corresponding base member.

10. The ramp recited in claim 9 further including:

two auxiliary panels each pivotally mounted between corresponding pairs of said front and rear bars, wherein said auxiliary panels are movable between a raised position and a lowered position in which said auxiliary said second pivoted downwardly and outwardly; and two folding members each pivotally mounted to opposite sides of said main ramp member proximate to sai dsecond end thereof, wherein said folding members are movable between an inward position in which said folding members rest on said top surface of said main ramp member and an outward position in which, when said first-mentioned panels are in said first position, said folding members cooperate with said auxiliary panels, when said auxiliary members are in said lowered position, to widen the ramp.

11. The ramp recited in claim 10 further including at least two trees for selectively securing said first-mentioned panels in said second position and said auxiliary panels in said raised position, wherein said trees are slidably mounted to the outside ends of said bars.

12. The ramp recited in claim 1 in combination with a trailer of the type used to transport wheel mounted machinery wherein:

said first end of said main ramp member is mounted to the trailer for rotation of said main ramp member between said loading position and said transporting position.

13. The trailer recited in claim 12 further including power means cooperating with the trailer and said main ramp member for rotating said main ramp member between said loading and said transporting positions.

14. The trailer recited in claim 13 wherein said power means comprises at least one hydraulic actuator.

* * * * *